(12) United States Patent
Okamoto

(10) Patent No.: US 10,465,774 B2
(45) Date of Patent: Nov. 5, 2019

(54) STARTING METHOD FOR VARIABLE SPEED ACCELERATOR AND STARTING CONTROL DEVICE FOR VARIABLE SPEED ACCELERATOR

(71) Applicant: MITSUBISHI HEAVY INDUSTRIES COMPRESSOR CORPORATION, Tokyo (JP)

(72) Inventor: Yoshiyuki Okamoto, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 106 days.

(21) Appl. No.: 15/756,940

(22) PCT Filed: Sep. 4, 2015

(86) PCT No.: PCT/JP2015/075158
§ 371 (c)(1),
(2) Date: Mar. 1, 2018

(87) PCT Pub. No.: WO2017/037934
PCT Pub. Date: Mar. 9, 2017

(65) Prior Publication Data
US 2018/0245671 A1      Aug. 30, 2018

(51) Int. Cl.
*F16H 61/02*  (2006.01)
*F16H 3/72*   (2006.01)
(Continued)

(52) U.S. Cl.
CPC ............... *F16H 3/728* (2013.01); *F16H 3/72* (2013.01); *F16H 61/02* (2013.01);
(Continued)

(58) Field of Classification Search
None
See application file for complete search history.

(56) References Cited

U.S. PATENT DOCUMENTS 2,299,911 A    10/1942  Logan
3,161,083 A *  12/1964  Roe .................. B60K 6/365
                                                  475/5
(Continued)

FOREIGN PATENT DOCUMENTS

DE       202012001679 U1   4/2012
EP            0138739 A1   4/1985
(Continued)

OTHER PUBLICATIONS

Written Opinion of the International Searching Authority issued in corresponding International Application No. PCT/JP2015/075158 dated Nov. 17, 2015, with translation (10 pages).
(Continued)

*Primary Examiner* — Dirk Wright
(74) *Attorney, Agent, or Firm* — Osha Liang LLP

(57) ABSTRACT

A starting method of a variable speed accelerator, which includes an electric device for generating rotational driving force and a transmission device for changing a speed of the rotational driving force generated by the electric device and transmits the changed rotational driving force to an object to be driven, the starting method includes: a constant speed electric motor starting step of starting a constant speed electric motor and gradually increasing a number of rotations in a first direction of a constant speed rotor and an internal gear; and a generator mode operating step of operating a variable speed electric motor in a generator mode and rotating a planetary gear carrier in the first direction, wherein the transmission device is a planetary gear transmission device, and wherein the electric device comprises: the constant speed electric motor.

5 Claims, 7 Drawing Sheets

(51) Int. Cl.
  *H02P 5/747* (2006.01)
  *F16H 61/662* (2006.01)
  *F16H 63/50* (2006.01)
  *F02N 11/08* (2006.01)

(52) U.S. Cl.
  CPC ... *F16H 61/0213* (2013.01); *F16H 61/66259* (2013.01); *F16H 63/50* (2013.01); *H02P 5/747* (2013.01); *F02N 2011/0892* (2013.01); *F02N 2300/104* (2013.01)

(56) References Cited

U.S. PATENT DOCUMENTS

| | | | | |
|---|---|---|---|---|
| 4,090,416 | A | * | 5/1978 | Hicks ............ F16D 3/185 475/317 |
| 4,514,991 | A | * | 5/1985 | Zinsmeyer ......... F16H 3/72 475/2 |
| 6,358,172 | B1 | * | 3/2002 | Hiegemann ......... F16H 3/72 475/329 |
| 7,211,018 | B2 | * | 5/2007 | Kimura ............ F16H 3/724 475/153 |
| 9,039,558 | B2 | * | 5/2015 | Li .................. B60K 1/02 475/149 |
| 2005/0113201 | A1 | | 5/2005 | Kimura et al. |
| 2018/0187778 | A1 | * | 7/2018 | Okamoto ......... F16H 3/724 |
| 2018/0252300 | A1 | * | 9/2018 | Okamoto ......... F16H 61/02 |
| 2019/0181779 | A1 | * | 6/2019 | Okamoto .......... F16H 3/72 |

FOREIGN PATENT DOCUMENTS

| | | |
|---|---|---|
| JP | S59-070497 A | 4/1984 |
| JP | S60-087698 A | 5/1985 |
| JP | 4472350 B2 | 6/2010 |
| JP | 2015-33913 A | 2/2015 |
| WO | 03/071160 A1 | 8/2003 |

OTHER PUBLICATIONS

International Search Report issued in corresponding International Application No. PCT/JP2015/075158 dated Nov. 17, 2015, with translation (4 pages).

\* cited by examiner

AXIAL DIRECTION
INPUT SIDE ←→ OUTPUT SIDE

STARTING METHOD FOR VARIABLE SPEED ACCELERATOR AND STARTING CONTROL DEVICE FOR VARIABLE SPEED ACCELERATOR

TECHNICAL FIELD

The present invention relates to a starting method of a variable speed accelerator and a starting control device thereof.

BACKGROUND

As a device for driving a rotary machine such as a compressor, there is a device having an electric device that generates rotational driving force and a transmission device that changes the speed of the rotational driving force generated by the electric device and transmits the result to the rotary machine.

Patent Literature 1 discloses a device in which a constant speed electric motor and a variable speed electric motor for variable speed are used as an electric device and a planetary gear transmission device is used as a transmission device, in order to accurately control a gear ratio. In this device, it is possible to change the number of rotations of an output shaft of the transmission device connected to a rotary machine by changing the number of rotations of the variable speed electric motor.

CITATION LIST

Patent Literature

[Patent Literature 1]
  Japanese Patent No. 4472350

In the aforementioned variable speed accelerator, torque of the constant speed electric motor and torque of variable speed electric motor are transferred to an object to be driven via the transmission device. At the time of starting of the variable speed accelerator, load torque of the object to be driven becomes large according to an increase in the torque of the constant speed electric motor and the torque of variable speed electric motor. However, since the load torque at the time of starting becomes large, it is necessary to increase the capacity of the constant speed electric motor. That is, it is necessary to select a constant speed electric motor in correspondence to the load torque at the time of starting.

SUMMARY

One or more embodiments of the present invention provide a starting method of a variable speed accelerator and a starting control device thereof, by which it is possible to reduce load torque of an object to be driven in the variable speed accelerator including an electric device having a constant speed electric motor and a variable speed electric motor, and a planetary gear transmission device that changes the speed of rotational driving force generated by the electric device and transmits the result to the object to be driven.

According to one or more embodiments of the present invention, a starting method of a variable speed accelerator, which includes an electric device for generating rotational driving force and a transmission device for changing a speed of the rotational driving force generated by the electric device and transmits the changed rotational driving force to an object to be driven, the starting method includes: a constant speed electric motor starting step of starting a constant speed electric motor and gradually increasing the number of rotations in a first direction of a constant speed rotor and an internal gear; and a generator mode operating step of operating a variable speed electric motor in a generator mode and rotating a planetary gear carrier in the first direction. The transmission device includes: a sun gear which rotates about an axis; a sun gear shaft which is fixed to the sun gear and extends in an axial direction about the axis; a planetary gear which is engaged with the sun gear, revolves about the axis, and rotates about a center line of the planetary gear; the internal gear which has a plurality of teeth arranged about the axis in an annular shape and is engaged with the planetary gear; the planetary gear carrier which has a planetary gear carrier shaft extending in the axial direction about the axis and supports the planetary gear so as to be revolvable about the axis and to be rotatable about the center line of the planetary gear; and an internal gear carrier which has an internal gear carrier shaft extending in the axial direction about the axis and supports the internal gear so as to be rotatable about the axis. The electric device includes: the constant speed electric motor which has the constant speed rotor for rotating the internal gear carrier shaft of the transmission device in the first direction; and the variable speed electric motor which has a variable speed rotor connected to the planetary gear carrier shaft of the transmission device, serves as a generator in a generator mode in which the planetary gear carrier shaft is rotated in the first direction, and serves as an electric motor in an electric motor mode in which the planetary gear carrier shaft is rotated in a second direction opposite to the first direction.

According to one or more embodiments of such a configuration, at the time of starting of the variable speed accelerator, the variable speed accelerator is operated in the generator mode and torque transferred from the variable speed electric motor is reduced, so that it is possible to reduce load torque of the object to be driven at the time point at which the constant speed electric motor reaches a rated number of rotations. In this way, it is possible to reduce the capacity of the constant speed electric motor.

In the starting method of the variable speed accelerator according to one or more embodiments, at the time of starting of the constant speed electric motor, the variable speed electric motor may be shifted to the generator mode.

According to one or more embodiments of such a configuration, it is possible to suppress the load torque of the object to be driven from an initial step at the time of starting of the variable speed accelerator.

In the starting method of the variable speed accelerator according to one or more embodiments, when the constant speed electric motor reaches the rated number of rotations, the variable speed electric motor may be shifted to the electric motor mode.

According to one or more embodiments of such a configuration, it is possible to reliably reduce the torque transferred from the variable speed electric motor at the time point at which the constant speed electric motor reaches the rated number of rotations.

According to one or more embodiments of the present invention, a starting control device of a variable speed accelerator, which includes an electric device for generating rotational driving force and a transmission device for changing a speed of the rotational driving force generated by the electric device and transmits the changed rotational driving force to an object to be driven, the starting control device includes: a rotation number control device which controls the number of rotations of a variable speed electric motor; a first switch which allows the variable speed electric motor to enter a power supply state and a power interruption state; a second switch which allows the constant speed electric motor to enter the power supply state and the power interruption state; and a control unit which instructs a rotation direction and the number of rotations of the variable speed accelerator to the rotation number control device, and instructs turn-on or turn off of the first switch and the second switch, wherein, when a starting instruction is accepted, the control unit instructs turn-on of the second switch to allow the constant speed electric motor to enter the power supply state, instructs turn-on of the first switch to allow the variable speed electric motor to enter the power supply state, and instructs the rotation number control device such that the variable speed electric motor is shifted to a generator mode. The transmission device includes: a sun gear which rotates about an axis; a sun gear shaft which is fixed to the sun gear and extends in an axial direction about the axis; a planetary gear which is engaged with the sun gear, revolves about the axis, and rotates about a center line of the planetary gear; an internal gear which has a plurality of teeth arranged about the axis in an annular shape and is engaged with the planetary gear; a planetary gear carrier which has a planetary gear carrier shaft extending in the axial direction about the axis and supports the planetary gear so as to be revolvable about the axis and to be rotatable about the center line of the planetary gear; and an internal gear carrier which has an internal gear carrier shaft extending in the axial direction about the axis and supports the internal gear so as to rotate about the axis. The electric device includes: the constant speed electric motor which has a constant speed rotor for rotating the internal gear carrier shaft of the transmission device in the first direction; and the variable speed electric motor which has a variable speed rotor connected to the planetary gear carrier shaft of the transmission device, serves as a generator in a generator mode in which the planetary gear carrier shaft is rotated in the first direction, and serves as an electric motor in an electric motor mode in which the planetary gear carrier shaft is rotated in a second direction opposite to the first direction.

The starting control device of the variable speed accelerator according to one or more embodiments may include a low current starter which starts the constant speed electric motor at a low current.

According to one or more embodiments of the present invention, at the time of starting of the variable speed accelerator, the variable speed accelerator is operated in the generator mode and torque transferred from the variable speed electric motor is reduced, so that it is possible to reduce load torque of an object to be driven at the time point at which the constant speed electric motor reaches a rated number of rotations. In this way, it is possible to reduce the capacity of the constant speed electric motor.

DESCRIPTION OF EMBODIMENTS

Hereinafter, a variable speed accelerator having a starting control device according to one or more embodiments of the present invention is described in detail with reference to the drawings.

Figure 1:
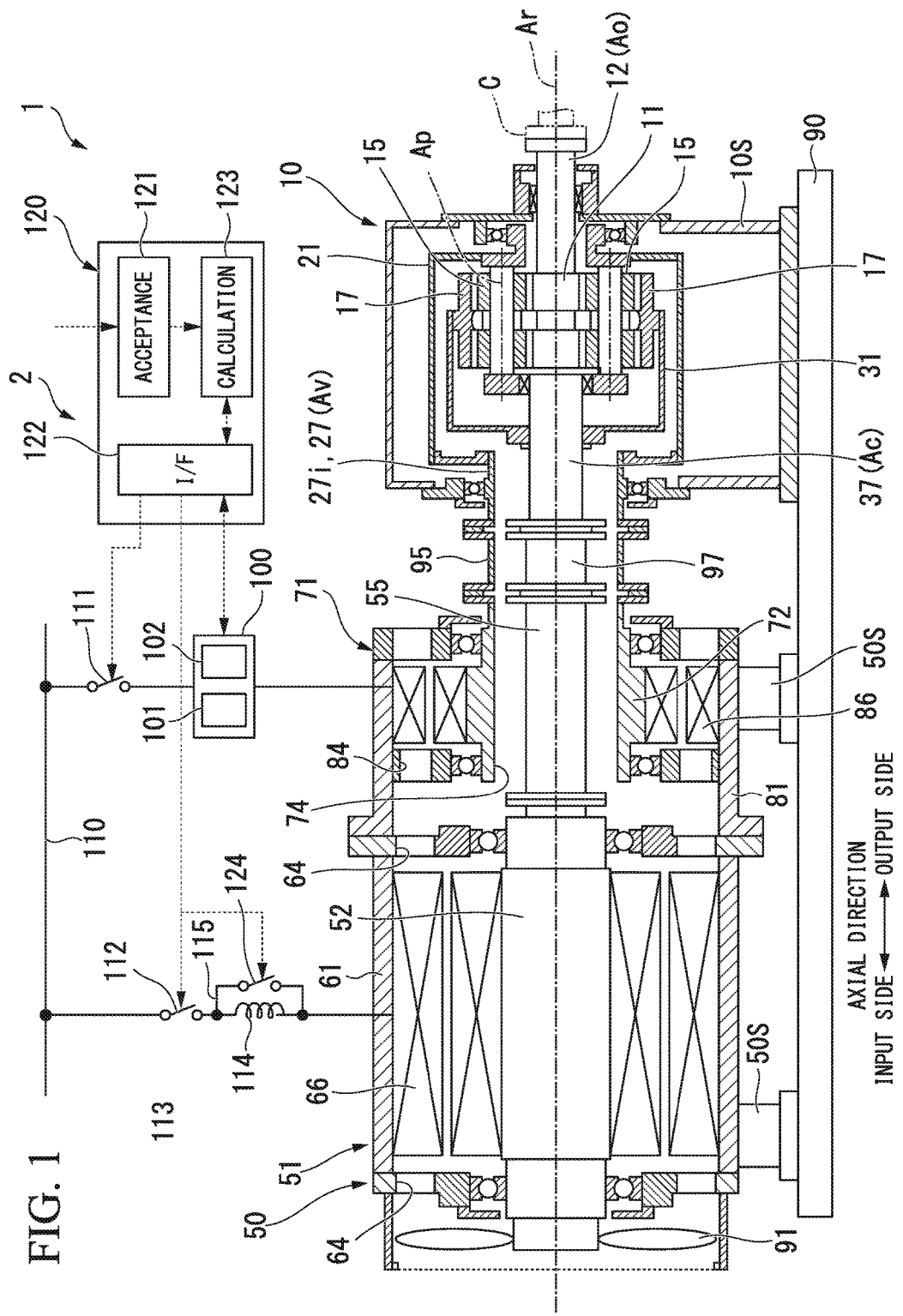
FIG. 1 is a sectional view of a variable speed accelerator according to one or more embodiments of the present invention.

As illustrated in FIG. 1, a variable speed accelerator 1 of one or more embodiments includes an electric device 50 that generates rotational driving force, and a transmission device 10 that changes the speed of the rotational driving force generated by the electric device 50 and transmits the result to an object to be driven. The variable speed accelerator 1, for example, can be applied to a fluid machine system such as a compressor system.

The electric device 50 has a constant speed electric motor 51 that rotationally drives an internal gear carrier shaft 37, which serves as a constant speed input shaft Ac, at a constant speed, and a variable speed electric motor 71 that rotationally drives an input side planetary gear carrier shaft 27i, which serves as a variable speed input shaft Av, at an arbitrary number of rotations. The variable speed accelerator 1 changes the number of rotations of the variable speed electric motor 71 and thus can change the number of rotations of an output shaft Ao of the transmission device 10 connected to the object to be driven.

The electric device 50 is supported on a frame 90 by an electric device support part 50S. The transmission device 10 is supported on the frame 90 by a transmission device support part 10S. Due to these support parts, it is possible to reliably fix the electric device 50 and the transmission device 10 which are heavy loads.

Figure 2:
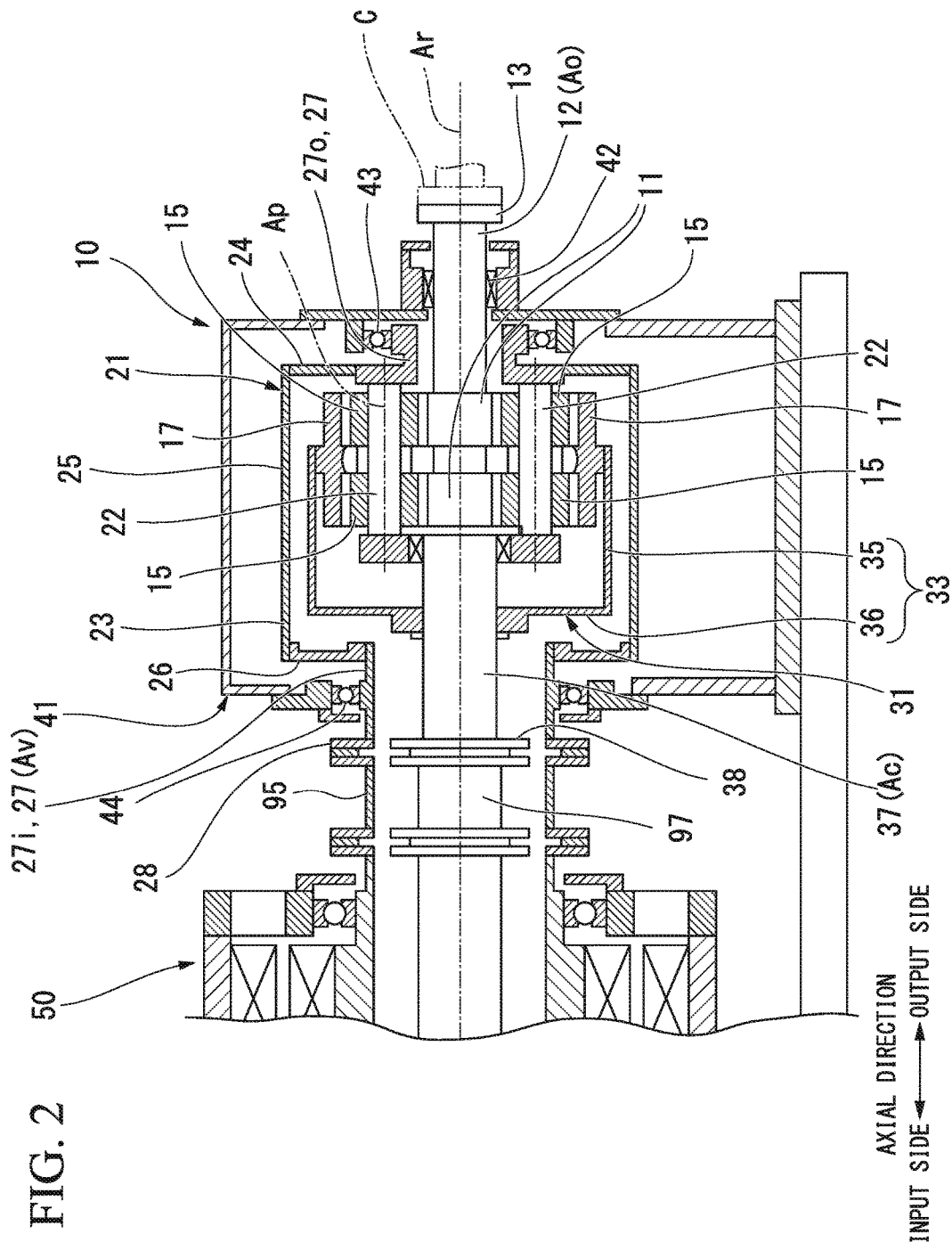
FIG. 2 is a sectional view of a transmission device according to one or more embodiments of the present invention.

The transmission device 10 is a planetary gear transmission device. As illustrated in FIG. 2, the transmission device 10 has a sun gear 11 that rotates about an axis Ar extending in a horizontal direction, a sun gear shaft 12 fixed to the sun gear 11, a plurality of planetary gears 15, an internal gear 17, a planetary gear carrier 21, an internal gear carrier 31, and a transmission casing 41 that covers these elements. Each of the planetary gears 15 is engaged with the sun gear 11, revolves about the axis Ar, and rotates about its own center line Ap, and the internal gear 17 has a plurality of teeth arranged about the axis Ar in an annular shape and is engaged with the plurality of planetary gears 15. The planetary gear carrier 21 supports the plurality of planetary gears 15 so as to be revolvable about the axis Ar and to be rotatable about the center line Ap of the planetary gears 15, and the internal gear carrier 31 supports the internal gear 17 so as to be rotatable about the axis Ar.

Hereinafter, an extension direction of the axis Ar is defined as an axial direction, one side of the axial direction is defined as an output side, and an opposite side of the output side is defined as an input side. Furthermore, a radial direction, in which the axis Ar is employed as a center, is simply defined as a radial direction below.

The sun gear shaft 12 forms a columnar shape about the axis Ar and extends to the output side of the axial direction from the sun gear 11. A flange 13 is formed at an end portion of the output side of the sun gear shaft 12. A rotor of a compressor C serving as an object to be driven, for example, is connected to the flange 13. The sun gear shaft 12 is supported so as to be rotatable about the axis Ar by a sun gear bearing 42 arranged at the output side of the sun gear 11. The sun gear bearing 42 is mounted at the transmission casing 41.

The planetary gear carrier 21 has a planetary gear shaft 22 provided for each of the plurality of planetary gears 15, a carrier body 23 that fixes relative positions of the plurality of planetary gear shafts 22, and a planetary gear carrier shaft 27 fixed to the carrier body 23 and extending in the axial direction about the axis Ar.

The planetary gear shaft 22 passes through the center line Ap of the planetary gear 15 in the axial direction and supports the planetary gear 15 so as to be rotatable about the center line. The carrier body 23 has an output side arm part 24 extending radially outward from the plurality of planetary gear shafts 22, a cylindrical part 25 forming a cylindrical shape about the axis Ar and extending to the input side from an outer end in the radial direction of the output side arm part 24, and an input side arm part 26 extending radially inward from an output side end of the cylindrical part 25.

The planetary gear carrier shaft 27 has an output side planetary gear carrier shaft 27o extending to the output side from the output side arm part 24 and an input side planetary gear carrier shaft 27i extending to the input side from the input side arm part 26. Both of the output side planetary gear carrier shaft 27o and the input side planetary gear carrier shaft 27i form a cylindrical shape about the axis Ar.

The output side planetary gear carrier shaft 27o is supported so as to be rotatable about the axis Ar by a planetary gear carrier bearing 43 arranged at the output side from the output side arm part 24. The planetary gear carrier bearing 43 is mounted at the transmission casing 41. The sun gear shaft 12 is inserted into an inner circumferential side of the output side planetary gear carrier shaft 27o.

The input side planetary gear carrier shaft 27i is supported so as to be rotatable about the axis Ar by a planetary gear carrier bearing 44 arranged at the input side from the input side arm part 26. The planetary gear carrier bearing 44 is mounted at the transmission casing 41. An annular flange 28 widening radially outward is formed at an input side end of the input side planetary gear carrier shaft 27i.

The internal gear carrier 31 has a carrier body 33 to which the internal gear 17 is fixed, and an internal gear carrier shaft 37 fixed to the carrier body 33 and extending in the axial direction about the axis Ar.

The carrier body 33 has a cylindrical part 35, which forms a cylindrical shape about the axis Ar and has an inner circumferential side to which the internal gear 17 is fixed, and an input side arm part 36 extending radially inward from an input side end of the cylindrical part 35.

The internal gear carrier shaft 37 forms a columnar shape about the axis Ar and is arranged at the input side of the sun gear shaft 12 forming a columnar shape about the axis Ar. The input side arm part 36 of the carrier body 33 is fixed to the internal gear carrier shaft 37. An annular or disk-like flange 38 widening radially outward is formed at an input side end of the internal gear carrier shaft 37. A part of the input side of the internal gear carrier shaft 37 is inserted into an inner circumferential side of the cylindrical input side planetary gear carrier shaft 27i. The axial direction positions of the flange 38 of the internal gear carrier shaft 37 and the flange 28 of the input side planetary gear carrier shaft 27i approximately coincide with each other.

Figure 3:
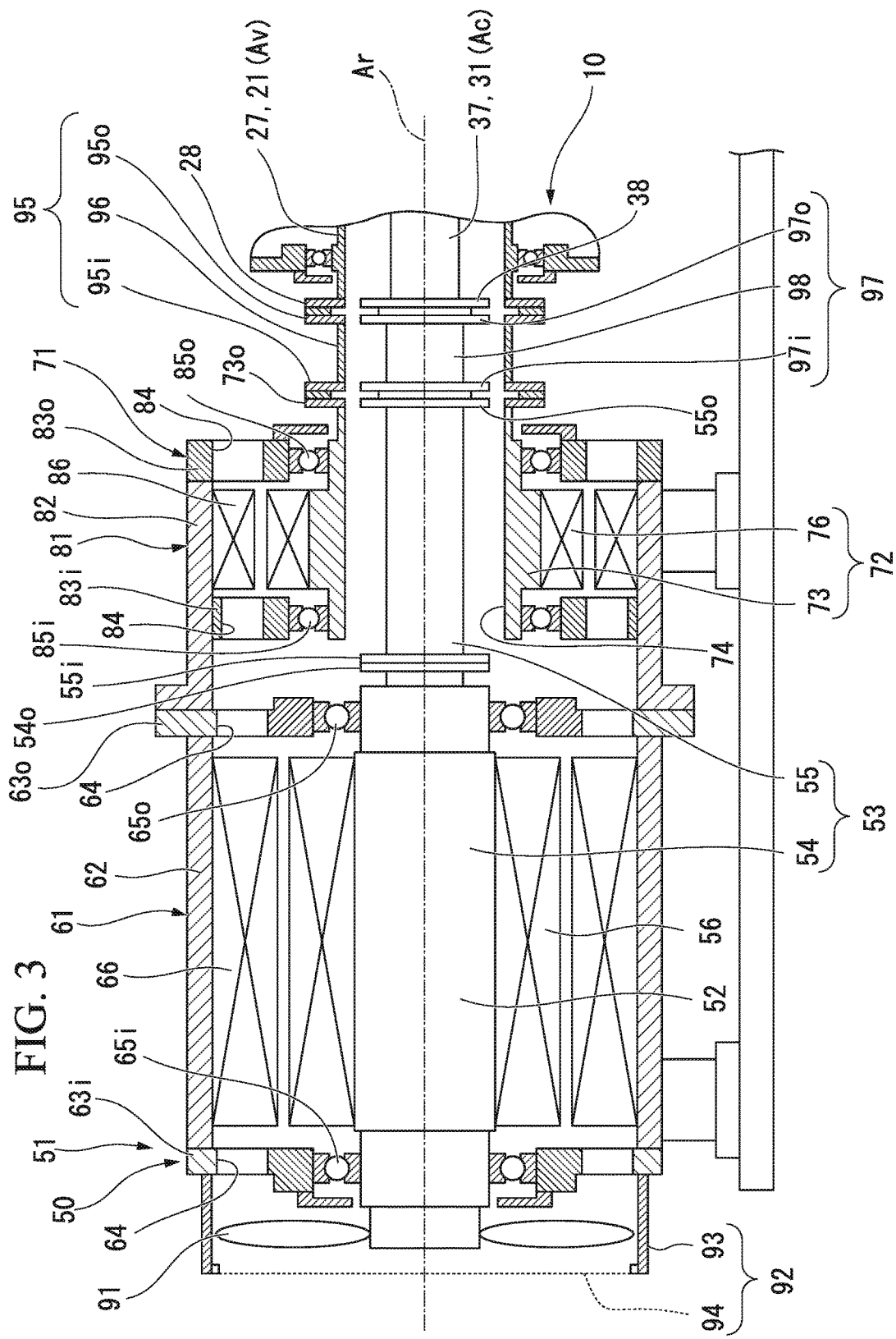
FIG. 3 is a sectional view of an electric device according to one or more embodiments of the present invention.

As illustrated in FIG. 3, the constant speed electric motor 51 rotationally drives the internal gear carrier shaft 37 of the transmission device 10 via a constant speed rotor extension shaft 55. The variable speed electric motor 71 rotationally drives the input side planetary gear carrier shaft 27i of the transmission device 10. The electric device 50 has a cooling fan 91 that cools the constant speed electric motor 51 and the variable speed electric motor 71, and a fan cover 92 that covers the cooling fan 91.

In one or more embodiments, the constant speed electric motor 51, for example, is an induction motor having 3 phases and 4 poles. Furthermore, the variable speed electric motor 71 is an induction motor having 6 poles which is greater than the number of poles of the constant speed electric motor 51. The specifications of the constant speed electric motor 51 and the variable speed electric motor 71 are not limited thereto and can be appropriately changed.

The constant speed electric motor 51 has a constant speed rotor 52, which rotates about the axis Ar and is connected to the internal gear carrier shaft 37 serving as the constant speed input shaft Ac of the transmission device 10, a constant speed stator 66 arranged at an outer circumferential side of the constant speed rotor 52, and a constant speed electric motor casing 61 having an inner circumferential side to which the constant speed stator 66 is fixed.

The constant speed electric motor 51 rotationally drives the constant speed rotor 52 in a first direction (a forward direction) which is the circumferential direction around the axis Ar. When the constant speed rotor 52 rotates in the first direction, the internal gear carrier shaft 37 and the internal gear carrier 31 rotate in the first direction.

The constant speed rotor 52 has a constant speed rotor shaft 53 and a conductor 56 fixed to an outer periphery of the constant speed rotor shaft 53. Furthermore, the constant speed rotor shaft 53 has a constant speed rotor body shaft 54, which forms a columnar shape about the axis Ar and has an outer periphery to which the conductor 56 is fixed, and a constant speed rotor extension shaft 55 which forms a columnar shape about the axis Ar and is fixed to an output side of the constant speed rotor body shaft 54.

At both ends in the axial direction of the constant speed rotor extension shaft 55, annular or disk-like flanges 55i and 55o widening radially outward are respectively formed. At an output side end of the constant speed rotor body shaft 54, an annular or disk-like flange 54o widening radially outward is formed. Since the flanges 55i, 55o, and 54o are connected to one another by a bolt and the like, the constant speed rotor extension shaft 55 and the constant speed rotor body shaft 54 are formed integrally with each other. The cooling fan 91 is fixed to an input side end of the constant speed rotor body shaft 54.

The constant speed stator 66 is arranged radially outward from the conductor 56 of the constant speed rotor 52. The constant speed stator 66 is formed from a plurality of coils.

The constant speed electric motor casing 61 has a casing body 62, which forms a cylindrical shape about the axis Ar and has an inner circumferential side to which the constant speed stator 66 is fixed, and lids 63i and 63o which close both ends in the axial direction of the cylindrical casing body 62. The lids 63*i* and 63*o* are respectively mounted with constant speed rotor bearings 65*i* and 65*o* that support the constant speed rotor body shaft 54 so as to be rotatable about the axis Ar. Furthermore, each of the lids 63*i* and 63*o* is formed with a plurality of openings 64 that pass through the lids 63*i* and 63*o* in the axial direction at positions radially outward from the constant speed rotor bearings 65*i* and 65*o*.

The input side end of the constant speed rotor body shaft 54 protrudes to the input side from the input side lid 63*i* of the constant speed electric motor casing 61. The aforementioned cooling fan 91 is fixed to the input side end of the constant speed rotor body shaft 54. Therefore, when the constant speed rotor 52 rotates, the cooling fan 91 also rotates together with the constant speed rotor 52. The fan cover 92 has a cylindrical cover body 93 arranged at an outer circumferential side of the cooling fan 91, and an air circulation plate 94 mounted at an inlet side opening of the cover body 93 and formed with a plurality of air holes. The fan cover 92 is fixed to the input side lid 63*i* of the constant speed electric motor casing 61.

The variable speed electric motor 71 has a variable speed rotor 72, which rotates about the axis Ar and is connected to the input side planetary gear carrier shaft 27*i* serving as a variable speed input shaft Av, a variable speed stator 86 arranged at an outer circumferential side of the variable speed rotor 72, and a variable speed electric motor casing 81 having an inner circumferential side to which the variable speed stator 86 is fixed.

The variable speed electric motor 71 can rotationally drive the variable speed rotor 72 in the first direction which is the circumferential direction around the axis Ar and a second direction opposite to the first direction. That is, the variable speed electric motor 71 can perform forward rotation and backward rotation.

The variable speed electric motor 71 serves as a generator by rotating the variable speed rotor 72 in the first direction. The state in which the variable speed electric motor 71 serves as a generator is called a generator mode. That is, the variable speed rotor 72 of the variable speed electric motor 71 rotates in the first direction in the generator mode.

The variable speed electric motor 71 serves as an electric motor by rotating the variable speed rotor 72 in the second direction opposite to the first direction. The state in which the variable speed electric motor 71 serves as an electric motor is called an electric motor mode. That is, the variable speed rotor 72 of the variable speed electric motor 71 rotates in the second direction in the electric motor mode.

When the variable speed electric motor 71 rotates in the first direction, the planetary gear carrier shaft 27 and the planetary gear carrier 21 rotate in the first direction.

The variable speed electric motor 71 of one or more embodiments is a phase induction motor having 6 poles and it is not possible to control the number of rotations in the vicinity of 0 rpm. In the variable speed electric motor 71 of one or more embodiments, for example, a range of −90 rpm to 90 rpm in which a rated number of rotations is equal to or less than 10%, is an uncontrollable range in which rotation number control is not possible. That is, a minimum number of rotations of the variable speed electric motor 71 of one or more embodiments is 90 rpm. Power supplied to the variable speed electric motor 71 at the minimum number of rotations of 90 rpm is 5 Hz corresponding to 10% of a power supply frequency (50 Hz).

The variable speed rotor 72 has a variable speed rotor shaft 73, and a conductor 76 fixed to an outer periphery of the variable speed rotor shaft 73. Furthermore, the variable speed rotor shaft 73 is formed with a shaft insertion hole 74 which forms a cylindrical shape about the axis Ar and penetrates in the axial direction. The constant speed rotor extension shaft 55 is inserted into the shaft insertion hole 74 of the variable speed rotor shaft 73. An annular flange 73*o* widening radially outward is formed at an output side end of the variable speed rotor shaft 73. The axial direction positions of the flange 73*o* of the variable speed rotor shaft 73 and the flange 55*o* formed at the output side end of the constant speed rotor extension shaft 55 approximately coincide with each other.

The variable speed stator 86 is arranged radially outward from the conductors and 76 of the variable speed rotor 72. The variable speed stator 86 is formed from a plurality of coils.

The variable speed electric motor casing 81 has a casing body 82, which forms a cylindrical shape about the axis Ar and has an inner circumferential side to which the variable speed stator 86 is fixed, an output side lid 83*o* which closes an output side end of the cylindrical casing body 82, and an inlet side lid 83*i* arranged at the input side from the variable speed stator 86 and fixed to the inner circumferential side of the cylindrical casing body 82. The lids 83*i* and 83*o* are respectively mounted with variable speed rotor bearings 85*i* and 85*o* that support the variable speed rotor shaft 73 so as to be rotatable about the axis Ar. Furthermore, each of the lids 83*i* and 83*o* is formed with a plurality of openings 84 that pass through the lids 83*i* and 83*o* in the axial direction at positions radially outward from the variable speed rotor bearings 85*i* and 85*o*.

As described above, by the plurality of openings 84 formed at the lids 83*i* and 83*o* of the variable speed electric motor casing 81 and the plurality of openings 64 formed at the lids 63*i* and 63*o* of the constant speed electric motor casing 61, a space in the variable speed electric motor casing 81 and a space in the constant speed electric motor casing 61 communicate with each other.

Furthermore, in the variable speed accelerator 1 of one or more embodiments, the constant speed rotor 52, the variable speed rotor 72, and the sun gear shaft 12 are arranged on the same axis.

The variable speed accelerator 1 of one or more embodiments further includes a flexible coupling 95 for variable speed, which is arranged between the input side planetary gear carrier shaft 27*i* serving as the variable speed input shaft Av and the variable speed rotor 72 and connects the input side planetary gear carrier shaft 27*i* and the variable speed rotor 72 to each other, and a flexible coupling 97 for constant speed, which is arranged between the internal gear carrier shaft 37 serving as the constant speed input shaft Ac and the constant speed rotor 52 and connects the internal gear carrier shaft 37 and the constant speed rotor 52 to each other.

Particularly, the variable speed accelerator 1 of one or more embodiments includes a starting control device 2 of the variable speed accelerator for controlling the variable speed electric motor 71 when the variable speed accelerator is started.

The starting control device 2 of the variable speed accelerator includes a rotation number control device 100 that controls the number of rotations of the variable speed electric motor 71, a first switch 111 that allows the variable speed electric motor 71 to enter a power supply state and a power interruption state, a second switch 112 that allows the constant speed electric motor 51 to enter the power supply state and the power interruption state, a reduced-voltage starter 113 (a low current starter) interposed between the second switch 112 and the constant speed electric motor 51, and a control unit 120 that controls operations of the rotation number control device 100, the first switch 111, the second switch 112, and the reduced-voltage starter 113.

The control unit 120 is configured with a computer. The control unit 120 has an acceptance unit 121, an interface 122, and a calculation unit 123. The acceptance unit 121 directly accepts an instruction from an operator or accepts an instruction from an upper control device, the interface 122 gives an instruction to the first switch 111, the rotation number control device 100, the second switch 112, and the reduced-voltage starter 113, and the calculation unit 123 generates an instruction for the first switch 111, the second switch 112, and the rotation number control device 100 in accordance with the instruction and the like accepted by the acceptance unit 121.

The first switch 111 is electrically connected to a power line 110 and the rotation number control device 100. The rotation number control device 100 is electrically connected to the variable speed electric motor 71.

The first switch 111 is turned on by an ON instruction from the control unit 120 and is turned off by an OFF instruction from the control unit 120. When the first switch 111 is turned on, power from the power line 110 is supplied to the variable speed electric motor 71 via the rotation number control device 100, so that the variable speed electric motor 71 enters the power supply state. When the first switch 111 is turned off, the supply of the power to the variable speed electric motor 71 from the power line 110 is interrupted, so that the variable speed electric motor 71 enters the power interruption state.

The rotation number control device 100 includes a frequency conversion unit 101 that changes a frequency of the power supplied from the power line 110, and a rotation direction change unit 102 that changes a rotation direction of the variable speed electric motor 71.

The frequency conversion unit 101 supplies the variable speed electric motor 71 with power of a frequency instructed from the control unit 120. The variable speed rotor 72 of the variable speed electric motor 71 rotates at the number of rotations according to the frequency. As described above, since the frequency of the variable speed rotor 72 is changed, the number of rotations of the planetary gear carrier 21 of the transmission device 10, which is connected to the variable speed rotor 72, is also changed. As a consequence, the number of rotations of the sun gear shaft 12 serving as the output shaft Ao of the transmission device 10 is also changed.

The rotation direction change unit 102 is a unit that changes the rotation direction of the variable speed electric motor 71 by using a circuit that switches a plurality of (3 in the case of one or more embodiments) power lines connected to the variable speed electric motor 71. That is, the rotation direction change unit 102 can rotate the variable speed rotor 72 forward or backward.

The second switch 112 is electrically connected to the power line 110 and the reduced-voltage starter 113.

The second switch 112 is turned on by the ON instruction from the control unit 120 and is turned off by the OFF instruction from the control unit 120. When the second switch 112 is turned on, the power from the power line 110 is supplied to the constant speed electric motor 51 via the reduced-voltage starter 113, so that the constant speed electric motor 51 enters the power supply state. When the second switch 112 is turned off, the supply of the power to the constant speed electric motor 51 from the power line 110 is interrupted, so that the constant speed electric motor 51 enters the power interruption state.

The reduced-voltage starter 113 is interposed between the second switch 112 and the constant speed electric motor 51. The reduced-voltage starter 113 is a unit for reducing a starting current of the constant speed electric motor 51. The reduced-voltage starter 113 of one or more embodiments is a korndorfer starter having an auto-transformer 114 (a starting compensator).

The auto-transformer 114 is interposed between the power line 110 and the constant speed electric motor 51. The reduced-voltage starter 113 has a connection wiring 115 that directly connects the power line 110 and the constant speed electric motor 51 to each other, and a third switch 124 provided to the connection wiring 115.

The control unit 120 turns off the third switch 124 of the reduced-voltage starter 113 at the time of starting of the constant speed electric motor 51. In this way, power is supplied to the constant speed electric motor 51 via the auto-transformer 114, so that it is possible to reduce the starting current of the constant speed electric motor 51. The control unit 120 turns on the third switch 124 after the starting is completed, that is, when the number of rotations of the constant speed electric motor 51 reaches the rated number of rotations.

The reduced-voltage starter is not limited to the korndorfer starter, and for example, it is also possible to employ other starters such as a reactor starter.

Furthermore, in the variable speed accelerator 1 of one or more embodiments, it is not necessary to provide the reduced-voltage starter and a full voltage may also be provided.

Furthermore, a current at the time of starting may also be reduced using an electric motor having a low starting current. That is, it is sufficient if it is possible to reduce the starting current of the constant speed electric motor 51 at the time of starting.

Figure 4:
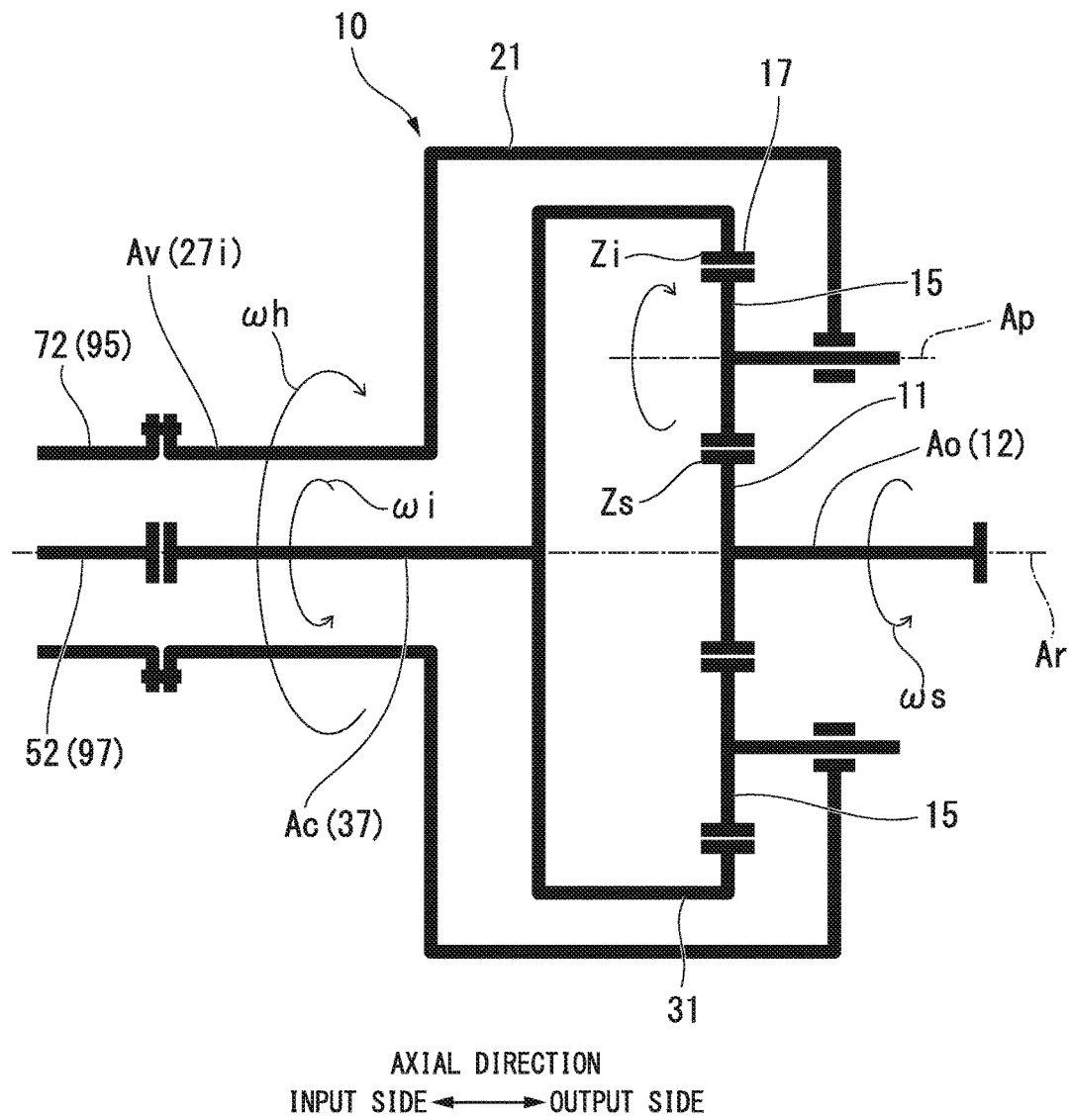
FIG. 4 is a schematic diagram illustrating a configuration of a transmission device according to one or more embodiments of the present invention.

Hereinafter, a relation between the number of teeth of each gear of the transmission device 10 and the number of rotations of each shaft of the transmission device 10 is described using FIG. 4.

The number of rotations of the sun gear shaft 12 serving as the output shaft Ao is defined as $\omega s$, the number of rotations of the internal gear carrier shaft 37 serving as the constant speed input shaft Ac is defined as $\omega i$, and the number of rotations of the input side planetary gear carrier shaft 27$i$ serving as the variable speed input shaft Av is defined as $\omega h$. Furthermore, the number of teeth of the sun gear 11 is defined as Zs and the number of teeth of the internal gear 17 is defined as Zi.

In this case, the relation between the number of teeth of each gear and the number of rotations of each shaft of the transmission device 10 can be expressed by the following Equation (1).

$$\omega s/\omega i = \omega h/\omega i - (1 - \omega h/\omega i) \times Zi/Zs \quad (1)$$

When the constant speed electric motor 51 is an induction motor having 4 poles and the power supply frequency is 50 Hz, the number $\omega i$ of rotations (the rated number of rotations) of the constant speed rotor 52 (the constant speed input shaft Ac) is 1,500 rpm. Furthermore, when the variable speed electric motor 71 is an induction motor having 6 poles and the power supply frequency is 50 Hz, the maximum number $\omega h$ of rotations (the rated number of rotations) of the variable speed rotor 72 (the variable speed input shaft Av) is 900 rpm. Furthermore, the ratio Zi/Zs of the number Zs of teeth of the sun gear 11 and the number Zi of teeth of the internal gear 17 is set to 4.

In this case, when orientation of the rotation of the constant speed rotor 52 (the internal gear 17) is defined as forward rotation (rotation of the first direction) and orientation of the rotation of the variable speed rotor 72 (the planetary gear carrier 21) corresponds to the maximum number (−900 rpm) of rotations of orientation (rotation of the second direction) opposite to the rotation of the constant speed rotor 52, the number $\omega s$ of rotations of the sun gear shaft 12 serving as the output shaft Ao is −10,500 rpm. This number (−10,500 rpm) of rotations is the maximum number of rotations of the sun gear shaft 12.

That is, in the transmission device 10 of one or more embodiments, when the internal gear 17 corresponding to the constant speed input shaft Ac is rotated forward at +1,500 rpm and the planetary gear carrier 21 corresponding to the variable speed input shaft Av is rotated backward at −900 rpm, the number $\omega s$ of rotations of the output shaft Ao becomes the maximum number of rotations.

When the variable speed range of the constant speed input shaft Ac is −900 rpm to +900 rpm, the number $\omega s$ of rotations of the output shaft Ao is reduced as the number of rotations of the constant speed input shaft Ac approaches +900 rpm. That is, the variable speed electric motor 71 is operated in the generator mode, so that the number $\omega s$ of rotations of the output shaft Ao is reduced and thus it is possible to reduce load torque of an object to be driven connected to the output shaft Ao.

When the orientation of the rotation of the constant speed rotor 52 is defined as the forward rotation and the orientation of the rotation of the variable speed rotor 72 corresponds to the minimum number (−90 rpm) of rotations of the orientation opposite to the rotation of the constant speed rotor 52, the number of rotations of the sun gear shaft 12 is −6,450 rpm.

When the number of rotations (the rated number of rotations) of the constant speed rotor 52 is +1,500 rpm and the number of rotations of the variable speed rotor 72 in the electric motor mode is controlled in a range of −300 rpm to −900 rpm by frequency control of the frequency conversion unit 101, in other words, when the frequency of power supplied to the variable speed electric motor 71 is controlled in a range of 16.7 Hz to 50 Hz, the number of rotations of the sun gear shaft 12 serving as the output shaft Ao can be controlled in a range of −7,500 rpm to −10,500 rpm. This range is a variable speed range of the sun gear shaft 12 serving as the output shaft Ao of the variable speed accelerator 1, and the variable speed accelerator 1 normally rotates the output shaft Ao in the variable speed range.

Figure 6:
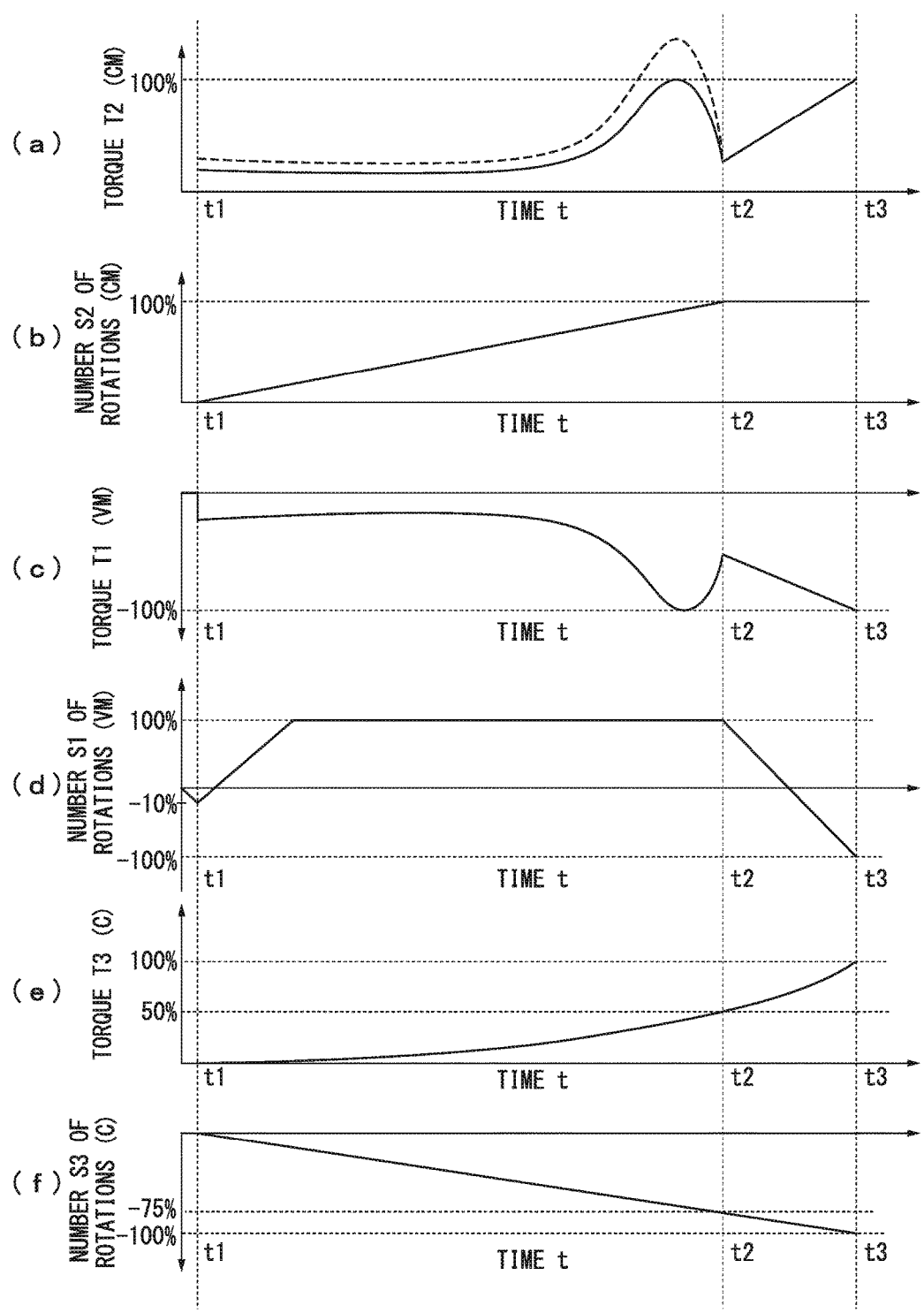
FIG. 6 is a graph illustrating the number of rotations and torque of a constant speed electric motor, the number of rotations and torque of a variable speed electric motor, and the number of rotations and torque of a sun gear shaft according to one or more embodiments of the present invention.

Hereinafter, characteristics of the constant speed electric motor 51 of one or more embodiments are described. FIG. 6 (*a*) is a graph illustrating a relation between a time and torque T2 after the starting of the constant speed electric motor 51 (CM), and FIG. 6 (*b*) is a graph illustrating a relation between a time and the number of rotations S2.

When the constant speed electric motor 51 is an induction motor having 3 phases and 4 poles and the constant speed electric motor 51 is started and enters the power supply state, the number S2 of rotations of the constant speed electric motor 51 gradually increases as illustrated in FIG. 6 (*b*). The time and the number S2 of rotations after the start are approximately proportional to each other.

The torque T2 of the constant speed electric motor 51 becomes large while drawing a curve as indicated by a dotted line of FIG. 6 (*a*). As indicated by the dotted line of FIG. 6 (*a*), the torque T2 of the constant speed electric motor 51 is not proportional to the number S2 of rotations of the constant speed electric motor 51, and rapidly increases when the number S2 of rotations approaches the rated number (100% and 1,500 rpm) of rotations.

There is a case where the torque T2 of the constant speed electric motor 51 exceeds rated torque (100%) before the number S2 of rotations of the constant speed electric motor 51 reaches the rated number of rotations. The torque T2 larger than the rated torque becomes small while the number S2 of rotations of the constant speed electric motor 51 is reaching the rated number of rotations, and gradually returns to the rated torque when the number S2 of rotations of the constant speed electric motor 51 reaches the rated number of rotations (the time t2).

Specifically, the torque T2 of the constant speed electric motor 51, for example, increases to 130% of the rated torque before the number S2 of rotations of the constant speed electric motor 51 reaches the rated number of rotations, and for example, decreases to 50% of the rated torque and then gradually increases to the rated torque at the time point (the time t2) at which the number S2 of rotations of the constant speed electric motor 51 reaches the rated number of rotations.

That is, there is a case where the torque T2 of the constant speed electric motor 51 exceeds the rated torque in the course of gradually increasing the number S2 of rotations after the start.

Figure 5:
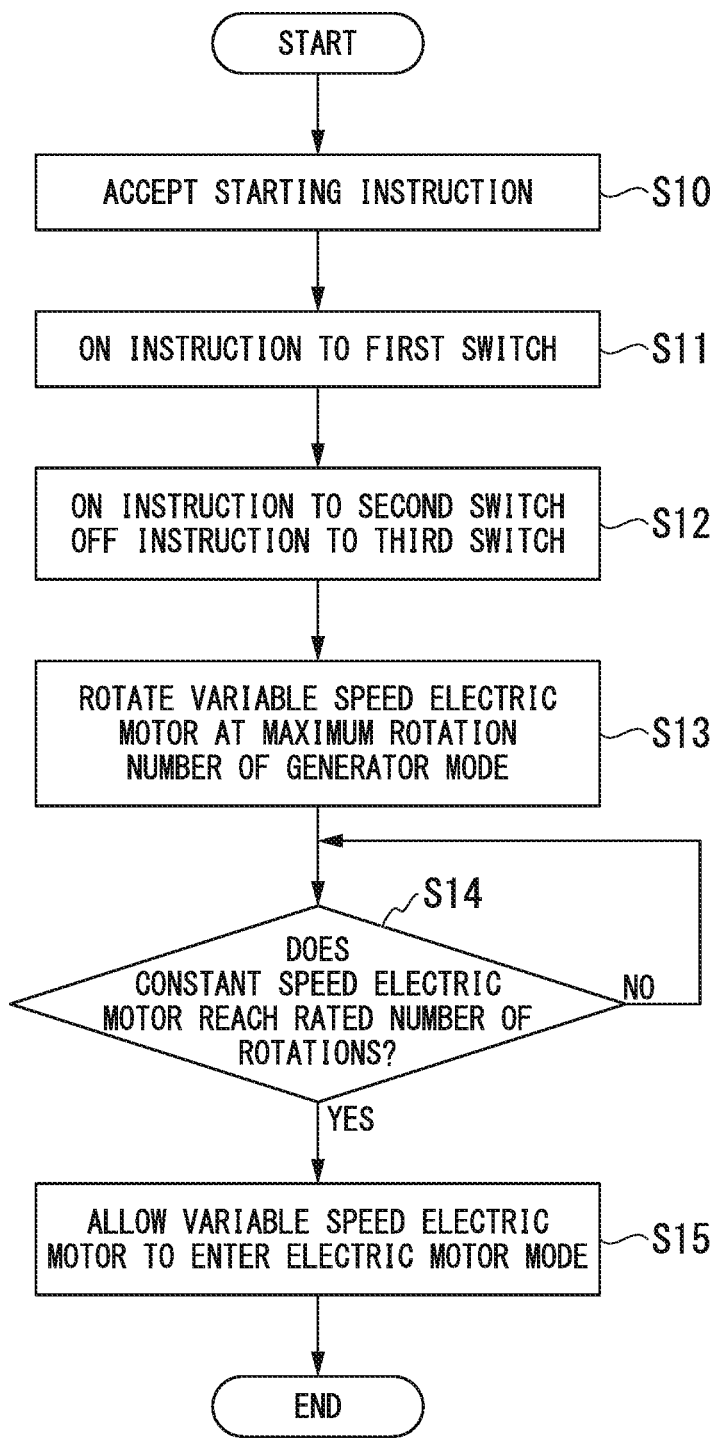
FIG. 5 is a flowchart illustrating an operation of a control device according to one or more embodiments of the present invention.

Next, the starting method of the variable speed accelerator 1 of one or more embodiments is described with reference to a flowchart illustrated in FIG. 5 and the graphs illustrated in FIG. 6.

FIG. 6 (*c*) is a graph illustrating a relation between a time t and torque T1 after the starting of the variable speed electric motor 71 (VM), and FIG. 6 (*d*) is a graph illustrating a relation between a time t and the number of rotations S1 after the starting of the variable speed electric motor 71. FIG. 6 (*e*) is a graph illustrating a relation between a time t and torque T3 of the sun gear shaft 12 to which the rotor of the compressor C is connected, and FIG. 6 (*f*) is a graph illustrating a relation between a time t and the number of rotations S3 of the sun gear shaft 12.

In the starting method of the variable speed accelerator 1, when a starting instruction of the variable speed accelerator 1 is accepted from an exterior (S10), the control unit 120 outputs an ON instruction to the first switch 111 (S11). In this way, the variable speed electric motor 71 rotates at an approximate minimum number of rotations of the electric motor mode. The minimum number of rotations is the number of rotations when a frequency inputted to the variable speed electric motor 71 is a minimum frequency settable by the frequency conversion unit 101 or a minimum frequency set in advance by an operator and the like.

When the first switch 111 is turned on, power from the power line 110 is supplied to the frequency conversion unit 101. Furthermore, when a minimum frequency as an instruction value of a frequency is accepted from the control unit 120, the frequency conversion unit 101 converts the frequency of the power from the power line 110 into the minimum frequency and supplies the converted minimum frequency to the variable speed electric motor 71. As a consequence, the variable speed electric motor 71 enters the power supply state in which the power of the minimum frequency is supplied. When power of a frequency (the maximum frequency: 50 Hz) equal to the power supply frequency is accepted, the number of rotations of the variable speed electric motor 71 of one or more embodiments reaches the maximum number 900 rpm of rotations as described above. Therefore, when power of a minimum frequency (5 Hz) corresponding to ⅒ of the power supply frequency is accepted, the number of rotations of the variable speed electric motor 71 reaches the minimum number +90 rpm of rotations as described above.

Next, the control unit 120 outputs the ON instruction to the second switch 112 (S12 and the time t1). Furthermore, the control unit 120 outputs an OFF instruction to the third switch 124 of the reduced-voltage starter 113.

When the second switch 112 is turned on, the power from the power line 110 is supplied to the constant speed electric motor 51 via the auto-transformer 114, so that the constant speed electric motor 51 enters the power supply state. When the constant speed electric motor 51 accepts the power from the power line 110, the number S2 of rotations of the constant speed electric motor 51 gradually increases as illustrated in FIG. 6 (*b*). In this way, the number of rotations in the first direction of the internal gear 17 of the transmission device 10 also increases. Furthermore, the power from the power line 110 is supplied to the constant speed electric motor 51 via the auto-transformer 114, so that the starting current of the constant speed electric motor 51 is reduced. That is, when the third switch is turned off, the torque T2 of the constant speed electric motor 51 is reduced as indicated by a solid line of FIG. 6 (*a*).

Approximately simultaneously to the starting of the constant speed electric motor 51, the control unit 120 shifts the variable speed electric motor 71 to the generator mode (S13 and the time t1). That is, the control unit 120 outputs an instruction, which allows the rotation direction of the variable speed rotor 72 to be the first direction (the forward rotation), to the rotation direction change unit 102 of the rotation number control device 100.

The variable speed electric motor 71 is shifted to the generator mode, so that the variable speed rotor 72 of the variable speed electric motor 71 rotates in the same direction (the first direction) as that of the constant speed rotor 52 of the constant speed electric motor 51. The control unit 120 instructs the number of rotations of the variable speed electric motor 71 to be the maximum number (900 rpm) of rotations of the first direction.

In this way, as illustrated in FIG. 6 (*d*), the number S1 of rotations of the variable speed electric motor 71 is changed from −90 rpm to +900 rpm.

At the time of starting of the variable speed accelerator 1, the variable speed electric motor 71 rotates in the generator mode, so that the internal gear 17 and the planetary gear carrier 21 rotate in the same rotation direction. Since the number of rotations of transmission device 10 of one or more embodiments decreases as the number of rotations of the planetary gear carrier 21 corresponding to the variable speed input shaft Av approaches the maximum number of rotations of the forward rotation, the variable speed electric motor 71 rotates in the generator mode, so that it is possible to reduce the number of rotations of the sun gear shaft 12 serving as the output shaft Ao. In this way, the torque T3 of the sun gear shaft 12 is reduced.

As illustrated in FIG. 6 (*c*), an absolute value of the torque T1 of the variable speed electric motor 71 becomes large with an increase in the torque T2 (FIG. 6 (*a*)) of the constant speed electric motor 51.

As illustrated in FIG. 6 (*f*), the number S3 of rotations of the sun gear shaft 12 increases in accordance with the number S2 of rotations of the constant speed electric motor 51.

As illustrated in FIG. 6 (*e*), the load torque T3 of the sun gear shaft 12 is suppressed to about 50% of the rated torque at the time point (t2) at which the number S2 of rotations of the constant speed electric motor 51 reaches 100%. Furthermore, as illustrated in FIG. 6 (*f*), the number S3 of rotations of the sun gear shaft 12 is suppressed to about 75% of the rated number of rotations at the time point (t2) at which the number S2 of rotations of the constant speed electric motor 51 reaches 100%.

During the starting of the variable speed accelerator 1, the control unit 120 determines whether or not the number S2 of rotations of the constant speed electric motor 51 has reached the rated number of rotations (S14). When the number S2 of rotations of the constant speed electric motor 51 reaches the rated number of rotations, the control unit 120 instructs the variable speed electric motor 71 to return to the electric motor mode (S15 and the time t2).

The variable speed electric motor 71 is shifted to the electric motor mode, so that the torque T3 of the sun gear shaft 12 serving as the output shaft Ao increases to the rated torque as illustrated in FIG. 6 (*e*). Furthermore, as illustrated in FIG. 6 (*f*), the number S3 of rotations in the second direction of the sun gear shaft 12 increases to the rated number of rotations.

Then, the variable speed accelerator 1 can be controlled in the variable speed range (−7,500 rpm to −10,500 rpm). That is, the number of rotations of the variable speed electric motor 71 is changed using the rotation number control device 100, so that it is possible to change the number of rotations of the output shaft of the transmission device 10 connected to an object to be driven.

Furthermore, when it is necessary to drive the variable speed electric motor 71 at the number of rotations of the uncontrollable range (−90 rpm to 90 rpm) of the variable speed electric motor 71, the control unit 120 of the variable speed accelerator 1 of one or more embodiments can perform uncontrollable speed range operation in which the number of rotations is approximated to the minimum number (90 rpm) of rotations of the forward direction and the minimum number (−90 rpm) of rotations of the reverse direction.

For example, when the acceptance unit 121 of the control unit 120 accepts an instruction for allowing the number of rotations of the sun gear shaft 12 to be −6,000 rpm, the calculation unit 123 performs calculation and derives a calculation result that the number of rotations of the variable speed electric motor 71 for allowing the number of rotations of the sun gear shaft 12 to be −6,000 rpm is 0 rpm.

The uncontrollable speed range operation is control for repeatedly and alternately performing a forward direction minimum rotation number instruction P1 (see FIG. 7) for giving an instruction for driving the variable speed electric motor 71 at the minimum number (90 rpm) of rotations of the forward direction, and a reverse direction minimum rotation number instruction for giving an instruction for driving the variable speed electric motor 71 at the minimum number of rotations of the reverse direction. By this control, the number of rotations of the variable speed electric motor 71 is approximated to a speed in the vicinity of 0 rpm.

Figure 7:
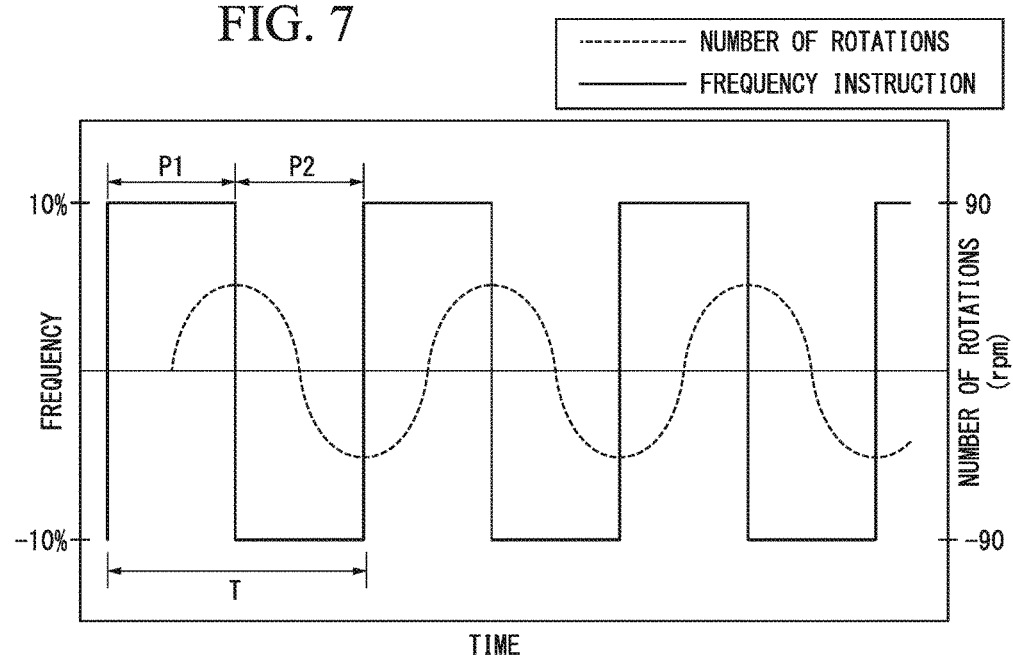
FIG. 7 is a graph illustrating a rotation number instruction value in an uncontrollable speed range operation of a variable speed electric motor according to one or more embodiments of the present invention.
Figure 8:
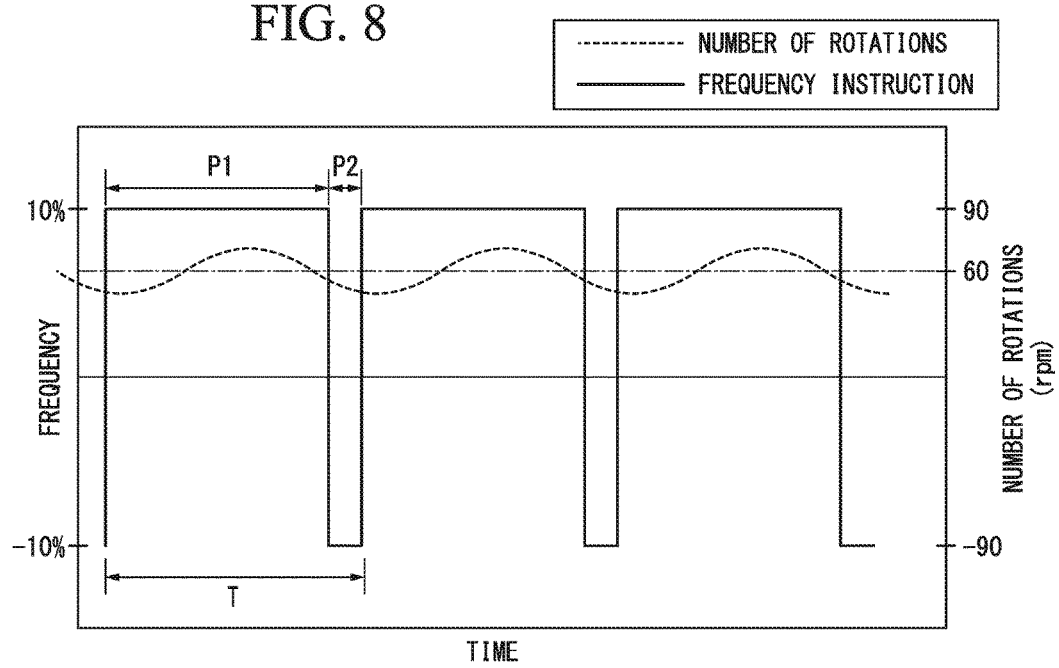
FIG. 8 is a graph illustrating a rotation number instruction value in an uncontrollable speed range operation of a variable speed electric motor according to one or more embodiments of the present invention.

FIG. 7 and FIG. 8 are graphs in which a horizontal axis is defined as a time and a vertical axis is defined as a frequency (a ratio for 50 Hz and indicated by—in the case of the backward rotation) supplied to the variable speed electric motor 71 and the number of rotations of the variable speed electric motor 71.

As illustrated in FIG. 7, when the uncontrollable speed range operation is performed, the interface 122 repeatedly and alternately gives, to the rotation number control device 100, a command for rotating the variable speed rotor 72 forward at a frequency of 5 Hz (10% of the power supply frequency) and a command for rotating the variable speed rotor 72 backward at the frequency of 5 Hz. A period T including the forward direction minimum rotation number instruction P1 and the subsequent reverse direction minimum rotation number instruction P2 is constant.

In the period T, times (pulse widths) of the forward direction minimum rotation number instruction P1 and the reverse direction minimum rotation number instruction P2 are equal to each other. In this way, the number of rotations of the variable speed electric motor 71 is changed in a sign curve shape as indicated by a dashed line. That is, the variable speed electric motor 71 repeats forward rotation and backward rotation.

The times of the forward direction minimum rotation number instruction P1 and the reverse direction minimum rotation number instruction P2 are allowed to be equal to each other, so that an average of the number of rotations can be 0 rpm. That is, it is possible to approximate to the number of rotations of 0 rpm while rotating the variable speed rotor 72.

Next, a description is provided for a control method when the number of rotations of the variable speed electric motor 71 is in the uncontrollable range and is not 0 rpm.

When the instructed number of rotations of the output shaft Ao is −5,700 rpm, the number of rotations of the variable speed electric motor 71 calculated by the calculation unit 123 is 60 rpm. Since the 60 rpm is in the uncontrollable range of the variable speed electric motor 71, the control unit 120 performs the uncontrollable speed range operation.

As illustrated in FIG. 8, in order to approximate to 60 rpm, the control unit 120 allows the times of the forward direction minimum rotation number instruction P1 and the reverse direction minimum rotation number instruction P2 to be different from each other. Specifically, the control unit 120 lengthens the time of the forward direction minimum rotation number instruction P1 and shortens the time of the reverse direction minimum rotation number instruction P2 such that an average value of the number of rotations of the variable speed electric motor 71 is 60 rpm.

For example, when P1:P2=5:5, the number of rotations can be approximated to 0 rpm, and when P1:P2=100, the number of rotations is 90 rpm. As described above, the ratio of the forward direction minimum rotation number instruction P1 and the reverse direction minimum rotation number instruction P2 is changed, so that it is possible to approximate to the number of rotations of the uncontrollable range. When the ratio of the forward direction minimum rotation number instruction P1 is increased, the approximate number of rotations (the average number of rotations of the variable speed electric motor 71) of the variable speed electric motor 71 is approximated to 90 rpm, and when the reverse direction minimum rotation number instruction P2 is increased, the approximate number of rotations of the variable speed electric motor 71 is approximated to −90 rpm.

When the number of rotations of the output shaft Ao of the variable speed accelerator 1 is controlled by the uncontrollable speed range operation, it is possible to increase the degree of freedom of the number of rotations. That is, even when the number of rotations is set in the uncontrollable range of the variable speed electric motor 71, the variable speed electric motor 71 is rotationally driven such that the average number of rotations is the number of rotations, so that the number of rotations of the output shaft can be approximated to a desired number of rotations.

According to one or more embodiments, at the time of starting of the variable speed accelerator 1 including the electric device 50, which has the constant speed electric motor 51 and the variable speed electric motor 71, and the planetary gear transmission device 10 that changes the speed of the rotational driving force generated by the electric device 50 and transmits the result to an object to be driven, the variable speed electric motor 71 is allowed to be shifted to the generator mode and the number of rotations of the output shaft Ao is suppressed, so that it is possible to reduce load torque of the object to be driven.

By so doing, it is possible to reduce the capacity of the constant speed electric motor 51. Furthermore, the constant speed electric motor 51 can start to operate at a low current, so that the reduced-voltage starter 113 and an electric motor of a low starting current are available.

Furthermore, the load torque of the object to be driven is reduced, so that it is possible to drive the object to be driven even though a load of the object to be driven is high such as when a compressor filled with gas is driven as the object to be driven.

Furthermore, in one or more embodiments, since the constant speed rotor 52 of the constant speed electric motor 51 and the variable speed rotor 72 of the variable speed electric motor 71 are arranged on the axis Ar of the transmission device 10, even when the constant speed rotor 52 and the variable speed rotor 72 are arranged at positions separated radially from the axis Ar of the transmission device 10, it is possible to achieve miniaturization as a whole. Moreover, in one or more embodiments, since it is not necessary to provide a transfer mechanism such as a belt and a pulley as with a case where the constant speed rotor 52 and the variable speed rotor 72 are arranged at positions separated radially from the axis Ar of the transmission device 10, it is possible to miniaturize the device from this standpoint and to further reduce the manufacturing cost by a reduction of the number of parts. Furthermore, in one or more embodiments, since it is not necessary to provide a transfer mechanism such as a belt and a pulley as with a case where the constant speed rotor 52 and the variable speed rotor 72 are arranged at positions separated radially from the axis Ar of the transmission device 10, it is also possible to reduce vibration regardless of a bending load from the belt and the like with respect to a shaft positioned on the axis Ar of the transmission device 10.

In one or more embodiments, the constant speed rotor 52 of the electric device 50 and the constant speed input shaft Ac of the transmission device 10 are connected to the flexible coupling 97 for constant speed, so that it is possible to permit eccentricity, declination, and deviation between the constant speed rotor 52 and the constant speed input shaft Ac. Moreover, in one or more embodiments, the variable speed rotor 72 of the electric device 50 and the variable speed input shaft Av of the transmission device 10 are connected to the flexible coupling 95 for variable speed, so that it is possible to permit eccentricity, declination, and deviation between the variable speed rotor 72 and the variable speed input shaft Av. Therefore, in one or more embodiments, it is possible to minimize time and effort of centering work of the transmission device 10 with respect to the electric device 50 and to suppress transfer of axis deflection to the transmission device 10 from the electric device 50 and transfer of axis deflection to the electric device 50 from the transmission device 10.

In one or more embodiments, the variable speed electric motor casing 81 is fixed to the constant speed electric motor casing 61. Therefore, in one or more embodiments, it is possible to accurately perform positioning (centering) of the variable speed rotor 72 with respect to the constant speed rotor 52 before the shipment of a variable electric motor system from a manufacturing factory. Thus, in one or more embodiments, it is possible to omit positioning work of the variable speed rotor 72 with respect to the constant speed rotor 52 in an installation site.

In one or more embodiments, when the constant speed rotor 52 rotates, the cooling fan 91 provided to the end of the constant speed rotor 52 also rotates. With the rotation of the cooling fan 91, external air is introduced into the constant speed electric motor casing 61, so that the constant speed rotor 52, the constant speed stator 66 and the like are cooled. Moreover, in the present embodiment, since the constant speed electric motor casing 61 and the variable speed electric motor casing 81 communicate with each other, the air introduced into the constant speed electric motor casing 61 is also introduced into the variable speed electric motor casing 81, so that the variable speed rotor 72, the variable speed stator 86 and the like are cooled. Thus, in one or more embodiments, it is possible to cool the two generators by using the cooling fan 91 and to miniaturize the device and reduce the manufacturing cost from the standpoint.

Furthermore, in one or more embodiments, the constant speed rotor 52, the variable speed rotor 72, and the sun gear shaft 12 are arranged on the same axis, so that it is possible to reduce an installation space of the variable electric motor system. Furthermore, since parts (a bevel gear and the like) for transferring rotation are not necessary, it is possible to suppress an increase in the number of parts and to reduce the manufacturing cost.

Furthermore, in one or more embodiments, the rod-like constant speed rotor shaft 53 (the constant speed rotor extension shaft 55) is inserted into the cylindrical variable speed rotor shaft 73 formed with the shaft insertion hole 74. That is, the constant speed rotor shaft 53 of the constant speed electric motor 51 with high output power is inserted into the variable speed rotor shaft 73 of the variable speed electric motor 71 with output power smaller than that of the constant speed electric motor 51. In this way, it is possible to employ an electric motor with higher output power (horse power) as the constant speed electric motor 51.

Furthermore, in one or more embodiments, the constant speed electric motor 51, the variable speed electric motor 71, the transmission device, and the compressor C are arranged on a linear line in this order, so that it is possible to achieve compactification of the whole device.

In addition, in the aforementioned embodiments, the constant speed rotor 52, the variable speed rotor 72, and the sun gear shaft 12 are arranged on the same axis; however, the present invention is not limited thereto. For example, the variable speed electric motor 71 may be arranged such that the axis of the variable speed rotor 72 is parallel to the axis of the constant speed rotor 52 and is located at a position different from that of the axis of the constant speed rotor 52.

Furthermore, in the aforementioned embodiments, an induction motor having 4 poles is exemplified as a constant speed electric motor 51 in order to rotate the compressor C at a high speed, and an induction motor having 6 poles is exemplified as a variable speed electric motor 71 in order to change the number of rotations of the compressor C in a constant range. However, when it is not necessary to rotate an object to be driven at a high speed, other types of electric motors may be used as the constant speed electric motor 51 and the variable speed electric motor 71.

Furthermore, in the aforementioned embodiments, the shaft insertion hole 74 is formed at the variable speed rotor 72 and the constant speed rotor 52 is inserted into the shaft insertion hole 74; however, it may be possible to employ a configuration in which the shaft insertion hole is formed at the constant speed rotor and the variable speed rotor is inserted into the shaft insertion hole.

Furthermore, in the aforementioned embodiments, the flexible coupling 95 for variable speed, which connects the variable speed rotor 72 and the variable speed input shaft Av to each other, serves as a first flexible coupling and the flexible coupling 97 for constant speed, which connects the constant speed rotor 52 and the constant speed input shaft Ac to each other, serves as a second flexible coupling. However, when the flexible coupling for constant speed is arranged at the outer circumferential side of the flexible coupling for variable speed, the flexible coupling for constant speed serves as the first flexible coupling and the flexible coupling for variable speed serves as the second flexible coupling.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached

REFERENCE SIGNS LIST

1 Variable speed accelerator
2 Starting control device of variable speed accelerator
10 Transmission device (planetary gear transmission device)
10S Transmission device support part
11 Sun gear
12 Sun gear shaft
15 Planetary gear
17 Internal gear
21 Planetary gear carrier
22 Planetary gear shaft
23 Carrier body
27 Planetary gear carrier shaft
27i Input side planetary gear carrier shaft
28 Flange
31 Internal gear carrier
33 Carrier body
37 Internal gear carrier shaft
38 Flange
41 Transmission casing
50 Electric device
50S Electric device support part
51 Constant speed electric motor
52 Constant speed rotor
53 Constant speed rotor shaft
54 Constant speed rotor body shaft
55 Constant speed rotor extension shaft
56 Conductor
61 Constant speed electric motor casing
62 Casing body
63i, 63o Lid
64 Opening
66 Constant speed stator
71 Variable speed electric motor
71S Variable speed electric motor support part
72 Variable speed rotor
73 Variable speed rotor shaft
73o Flange
74 Shaft insertion hole
76 Conductor
81 Variable speed electric motor casing
82 Casing body
83i, 83o Lid
84 Opening 86 Variable speed stator
91 Cooling fan
100 Rotation number control device
101 Frequency conversion unit
102 Rotation direction change unit
111 First switch
112 Second switch
113 Reduced-voltage starter (low current starter)
116 Carrier body
117 Transfer part
118 Carrier shaft gear
119 Carrier body gear
120 Control unit
Ap Center line
Ar Axis

The invention claimed is:

1. A starting method of a variable speed accelerator comprising an electric device that generates rotational driving force and a transmission device that changes a speed of the rotational driving force generated by the electric device and transmits the changed rotational driving force to an object to be driven, the starting method comprising:
   starting a constant speed electric motor and gradually increasing a number of rotations in a first direction of a constant speed rotor and an internal gear; and
   operating a variable speed electric motor in a generator mode and rotating a planetary gear carrier in the first direction,
   wherein the transmission device comprises:
      a sun gear that rotates about an axis;
      a sun gear shaft that is fixed to the sun gear and extends in an axial direction about the axis;
      a planetary gear that is engaged with the sun gear, revolves about the axis, and rotates about a center line of the planetary gear;
      the internal gear that comprises a plurality of teeth arranged about the axis in an annular shape and is engaged with the planetary gear;
      the planetary gear carrier that comprise a planetary gear carrier shaft extending in the axial direction about the axis and supports the planetary gear to be revolvable about the axis and to be rotatable about the center line of the planetary gear; and
      an internal gear carrier that comprises an internal gear carrier shaft extending in the axial direction about the axis and supports the internal gear to be rotatable about the axis, and
   wherein the electric device comprises:
      the constant speed electric motor that comprises the constant speed rotor that rotates the internal gear carrier shaft of the transmission device in the first direction; and
      the variable speed electric motor that comprises a variable speed rotor connected to the planetary gear carrier shaft of the transmission device, serves as a generator in a generator mode in which the planetary gear carrier shaft is rotated in the first direction, and serves as an electric motor in an electric motor mode in which the planetary gear carrier shaft is rotated in a second direction opposite to the first direction.

2. The starting method of the variable speed accelerator according to claim 1, wherein, at a time of starting of the constant speed electric motor, the variable speed electric motor is shifted to the generator mode.

3. The starting method of the variable speed accelerator according to claim 1, wherein, when the constant speed electric motor reaches a rated number of rotations, the variable speed electric motor is shifted to the electric motor mode.

4. A starting control device of a variable speed accelerator comprising an electric device that generates rotational driving force and a transmission device that changes a speed of the rotational driving force generated by the electric device and transmits the changed rotational driving force to an object to be driven, the starting control device comprising:
   a rotation number control device that controls the number of rotations of a variable speed electric motor;
   a first switch that allows the variable speed electric motor to enter a power supply state and a power interruption state;
   a second switch that allows the constant speed electric motor to enter the power supply state and the power interruption state; and
   a control unit that instructs a rotation direction and the number of rotations of the variable speed accelerator to the rotation number control device, and instructs turn-on or turn off of the first switch and the second switch,
   wherein, when a starting instruction is accepted,
      the control unit instructs turn-on of the first switch to allow the variable speed electric motor to enter the power supply state,
      the control unit instructs turn-on of the second switch to allow the constant speed electric motor to enter the power supply state, and gradually increases a number of rotations in a first direction of a constant speed rotor and an internal gear, and
   when the variable speed electric motor becomes in the power supply state, the control unit instructs the rotation number control device such that the variable speed electric motor is shifted to a generator mode,
   wherein the transmission device comprises:
      a sun gear that rotates about an axis;
      a sun gear shaft that is fixed to the sun gear and extends in an axial direction about the axis;
      a planetary gear that is engaged with the sun gear, revolves about the axis, and rotates about a center line of the planetary gear;
      the internal gear that comprises a plurality of teeth arranged about the axis in an annular shape and is engaged with the planetary gear;
      a planetary gear carrier that comprises a planetary gear carrier shaft extending in the axial direction about the axis and supports the planetary gear to be revolvable about the axis and to be rotatable about the center line of the planetary gear; and
      an internal gear carrier that comprises an internal gear carrier shaft extending in the axial direction about the axis and supports the internal gear to rotate about the axis, and
   wherein the electric device comprises:
      the constant speed electric motor that comprises the constant speed rotor that rotates the internal gear carrier shaft of the transmission device in the first direction; and
      the variable speed electric motor that comprises a variable speed rotor connected to the planetary gear carrier shaft of the transmission device, serves as a generator in a generator mode in which the planetary gear carrier shaft is rotated in the first direction, and serves as an electric motor in an electric motor mode in which the planetary gear carrier shaft is rotated in a second direction opposite to the first direction.

5. The starting control device of the variable speed accelerator according to claim 4, further comprising:
a low current starter that starts the constant speed electric motor at a low current.

* * * * *